(12) United States Patent
Pan

(10) Patent No.: US 11,400,868 B2
(45) Date of Patent: Aug. 2, 2022

(54) VEHICLE IMAGE-TAKING DEVICE AND VEHICLE

(71) Applicants: Global Media Industry Group Co., Ltd., Shenzhen (CN); Lei Pan, Shenzhen (CN)

(72) Inventor: Lei Pan, Shenzhen (CN)

(73) Assignee: GLOBAL MEDIA INDUSTRY GROUP CO., LTD., Shenzhen (CN)

( * ) Notice: Subject to any disclaimer, the term of this patent is extended or adjusted under 35 U.S.C. 154(b) by 910 days.

(21) Appl. No.: 16/307,338

(22) PCT Filed: Mar. 22, 2018

(86) PCT No.: PCT/CN2018/079985
§ 371 (c)(1),
(2) Date: Dec. 5, 2018

(87) PCT Pub. No.: WO2019/169668
PCT Pub. Date: Sep. 12, 2019

(65) Prior Publication Data
US 2021/0229605 A1    Jul. 29, 2021

(30) Foreign Application Priority Data

Mar. 9, 2018   (CN) .......................... 201810198929.8

(51) Int. Cl.
*B60R 11/04*    (2006.01)
*F16B 2/00*     (2006.01)
(Continued)

(52) U.S. Cl.
CPC .............. *B60R 11/04* (2013.01); *F16B 2/005* (2013.01); *F16M 11/04* (2013.01); *F16M 11/10* (2013.01);
(Continued)

(58) Field of Classification Search
CPC ....... G03B 17/56; G03B 17/561; F16B 2/005; F16M 11/04; F16M 11/10; F16M 11/12;
(Continued)

(56) References Cited

U.S. PATENT DOCUMENTS

| 2007/0115357 A1* | 5/2007 | Stein ...................... H04N 7/181 |
| | | 348/148 |
| 2014/0028243 A1* | 1/2014 | Rayner ................ H04B 1/3888 |
| | | 320/103 |

(Continued)

FOREIGN PATENT DOCUMENTS

| CN | 104245427 | 12/2014 | |
| CN | 106027871 | * 10/2016 | ............. B60R 11/04 |

(Continued)

OTHER PUBLICATIONS

International Search Report and Written Opinion dated Aug. 13, 2018 from Chinese Application No. PCT/CN2018/079985.

*Primary Examiner* — Clayton E. LaBalle
*Assistant Examiner* — Kevin C Butler
(74) *Attorney, Agent, or Firm* — Hogan Lovells US LLP

(57) ABSTRACT

A vehicle image-taking device and a vehicle are provided, relating to the technical field of vehicles. The vehicle image-taking device includes an image-taking mechanism and a fixing mechanism. The fixing mechanism including a fixation portion and an installation portion, the installation portion is used for fixing the image-taking mechanism, and the fixation portion is provided thereon with a clamping member used for being clamped in a rubber strip of a vehicle. In the use process, the clamping member on the fixation portion is clamped in the rubber strip of a vehicle, so that the fixation portion is fixedly connected with the vehicle. Since the image-taking mechanism is fixed on the installation portion, the image-taking mechanism is then fixed on the vehicle. Such installation manner of clamping (Continued)

is simple to operate, does not damage or contaminate the vehicle body, and reduces the installation cost. In addition, the clamping member can cooperate with any rubber strip in the vehicle, i.e., the installation position and the installation direction of the image-taking mechanism inside the vehicle can be selected according to the actual situation, thereby expanding the application scope of the device. The installation of the vehicle image-taking device is simple, and can avoid contaminating and damaging the vehicle body.

20 Claims, 2 Drawing Sheets

(51) Int. Cl.
  *G03B 17/56* (2021.01)
  *F16M 11/04* (2006.01)
  *F16M 11/18* (2006.01)
  *F16M 11/10* (2006.01)
  *F16M 11/12* (2006.01)
  *B60R 11/00* (2006.01)

(52) U.S. Cl.
  CPC .............. *F16M 11/12* (2013.01); *F16M 11/18* (2013.01); *G03B 17/56* (2013.01); *G03B 17/561* (2013.01); *B60R 2011/004* (2013.01); *B60R 2011/0059* (2013.01); *B60R 2011/0089* (2013.01)

(58) Field of Classification Search
  CPC .............. F16M 11/18; B60R 2011/004; B60R 2011/0059; B60R 2011/0089
  USPC ........................................................ 396/428
  See application file for complete search history.

(56) References Cited

U.S. PATENT DOCUMENTS

| | | | |
|---|---|---|---|
| 2014/0199884 A1* | 7/2014 | Jordan | B63B 34/60 439/574 |
| 2015/0328803 A1* | 11/2015 | Burns | B29C 33/3857 264/482 |
| 2017/0108864 A1* | 4/2017 | Wiklinska | B60W 60/0051 |
| 2018/0341289 A1* | 11/2018 | Schachter | G06F 1/1632 |
| 2018/0361949 A1* | 12/2018 | Okuda | B60R 11/04 |
| 2019/0011807 A1* | 1/2019 | Tang | G03B 17/55 |
| 2019/0246020 A1* | 8/2019 | Winden | H04N 5/2252 |
| 2019/0351840 A1* | 11/2019 | Kasarla | H04N 5/2257 |
| 2020/0084352 A1* | 3/2020 | Conger | H01R 27/02 |
| 2021/0229605 A1* | 7/2021 | Pan | F16B 2/005 |

FOREIGN PATENT DOCUMENTS

| | | |
|---|---|---|
| CN | 206341302 | 7/2017 |
| CN | 206589789 | 10/2017 |

\* cited by examiner

VEHICLE IMAGE-TAKING DEVICE AND VEHICLE

CROSS-REFERENCE TO RELATED APPLICATIONS

The present application claims the priority to the Chinese patent application with the application number CN201810198929.8, filed with the Chinese Patent Office on Mar. 9, 2018 and entitled "Vehicle Image-taking Device and Vehicle", which is incorporated herein by reference in its entirety.

TECHNICAL FIELD

The present disclosure relates to the technical field of vehicles, and particularly to a vehicle image-taking device and a vehicle.

BACKGROUND ART

With the increasing complexity of road conditions, more and more vehicles are equipped with cameras to cope with more and more complicated traffic conditions. A camera can record images inside or outside a vehicle when the vehicle is moving or parked, and the images can be displayed on a rear-view mirror or a DVD navigator.

However, the operations of the installation of the existing cameras are cumbersome, and can contaminate and damage the vehicle body easily.

SUMMARY

The object of the present disclosure includes, for example, providing a vehicle image-taking device and a vehicle, so as to overcome the technical problems existing in the prior art that the operations of the installation of the cameras are cumbersome, and can contaminate and damage the vehicle body easily.

A vehicle image-taking device, comprising an image-taking mechanism and a fixing mechanism;

the fixing mechanism comprising a fixation portion and an installation portion, the installation portion being used for fixing the image-taking mechanism, and the fixation portion being provided with a clamping member used for being clamped in a rubber strip of a vehicle.

Further, in a preferred embodiment of the present disclosure, the image-taking mechanism comprises a camera; and the installation portion is in a ring shape and is provided with a through hole and an adjusting member, and the camera passes through the through hole and is in interference fit with the adjusting member.

Further, in a preferred embodiment of the present disclosure, the adjusting member, which is annular, is disposed at an edge of the through hole, and the adjusting member extends in an axial direction of the through hole towards the interior of the ring shape of the installation portion, so as to form an adjusting cavity; and the camera comprises a spherical adjusting portion disposed in the adjusting cavity, and the camera is interference-fitted with the adjusting member through the adjusting portion.

Further, in a preferred embodiment of the present disclosure, the inner diameter of the adjusting member is at least smaller than the diameter of the spherical adjusting portion.

Further, in a preferred embodiment of the present disclosure, the adjusting member comprises a plurality of protrusions; and the plurality of protrusions are arranged at intervals at the edge of the through hole to form the adjusting cavity.

Further, in a preferred embodiment of the present disclosure, the adjusting portion is provided thereon with a first limiting member, and the adjusting member is provided thereon with a second limiting member for cooperating with the first limiting member.

Further, in a preferred embodiment of the present disclosure, the first limiting member comprises a plurality of convex edges, and the second limiting member comprises grooves cooperating with the convex edges.

Further, in a preferred embodiment of the present disclosure, the plurality of convex edges are sequentially arranged at intervals in a circumferential direction of the adjusting portion; and there are a plurality of grooves, and the plurality of grooves are sequentially arranged at intervals, and the plurality of grooves and the plurality of convex edges are in one-to-one correspondence and in snap-fit engagement.

Further, in a preferred embodiment of the present disclosure, the convex edges each include a rubber strip.

Further, in a preferred embodiment of the present disclosure, the image-taking mechanism further comprises a wire electrically connected to the camera; and the fixation portion is provided thereon with a fastener, and the wire is clamped in the fastener.

Further, in a preferred embodiment of the present disclosure, a plurality of fasteners are arranged at intervals in the length direction of a connection plate, and the plurality of fasteners simultaneously fasten the wire.

Further, in a preferred embodiment of the present disclosure, the installation portion further comprises a protective shell, the protective shell is provided with a through hole, and the adjusting member is disposed inside the protective shell.

Further, in a preferred embodiment of the present disclosure, the adjusting member is made of a plastic material.

Further, in a preferred embodiment of the present disclosure, the fixation portion comprises a connection plate, and the clamping member and the installation portion are correspondingly disposed at two opposite sides of the connection plate.

Further, in a preferred embodiment of the present disclosure, there are a plurality of clamping members, and the clamping members are arranged at intervals in the length direction of the connection plate.

Further, in a preferred embodiment of the present disclosure, the clamping member is perpendicular to the connection plate.

Further, in a preferred embodiment of the present disclosure, the clamping member is provided thereon with a friction portion; and the friction portion is used for abutting against the rubber strip of the vehicle.

Further, in a preferred embodiment of the present disclosure, the friction portion comprises a friction protrusion or a matte layer (abrasive layer).

Further, in a preferred embodiment of the present disclosure, the adjusting member is integrally formed with the installation portion.

A vehicle comprising the vehicle image-taking device as described above.

With regard to the vehicle image-taking device provided by the present disclosure, in the use process, the clamping member on the fixation portion is clamped in the rubber strip of a vehicle, so that the fixation portion is fixedly connected with the vehicle, and since the image-taking mechanism is fixed on the installation portion, the image-taking mechanism is then fixed on the vehicle. Such installation manner of clamping is simple to operate, does not damage or contaminate the vehicle body, and reduces the installation cost. In addition, the clamping member can cooperate with any rubber strip in the vehicle, i.e., the installation position and installation direction of the image-taking mechanism inside the vehicle can be selected according to the actual situation, thereby expanding the application scope of the device.

As can be seen from the above, the installation manner of the vehicle image-taking device described above is simple, and can avoid contaminating and damaging the vehicle body.

The vehicle provided by the present disclosure comprises the vehicle image-taking device, wherein in the use process, the clamping member on the fixation portion is clamped in the rubber strip of the vehicle, so that the fixation portion is fixedly connected with the vehicle, and since the image-taking mechanism is fixed on the installation portion, the image-taking mechanism is then fixed on the vehicle. Such installation manner of clamping is simple to operate, does not damage or contaminate the vehicle body, and reduces the installation cost. In addition, the clamping member can cooperate with any rubber strip in the vehicle, i.e., the installation position and installation direction of the image-taking mechanism inside the vehicle can be selected according to the actual situation, thereby expanding the application scope of the device.

As can be seen from the above, the installation manner of the vehicle image-taking device of the vehicle described above is simple, and can avoid contaminating and damaging the vehicle body.

BRIEF DESCRIPTION OF DRAWINGS

In order to more clearly illustrate the technical solutions of the embodiments of the present disclosure or in the prior art, brief description is made below on the drawings required to be used in the description of the embodiments or the prior art. Obviously, the following drawings illustrate some of the embodiments of the present disclosure, and for a person of ordinary skills in the art, other drawings may be obtained from these drawings without inventive effort.

Reference signs: 1—image-taking mechanism; 2—fixing mechanism; 3—clamping member; 4—through hole; 5—adjusting member; 6—adjusting cavity; 7—adjusting portion; 8—convex edge; 9—groove; 10—rubber strip; 11—fastener; 12—connection plate; 13—protective shell; 101—camera; 102—wire; 201—fixation portion; 202—installation portion; and 501—protrusion.

DETAILED DESCRIPTION OF EMBODIMENTS

The technical solutions of the present disclosure will be described below clearly and completely with reference to the drawings. Apparently, the embodiments described are some of the embodiments of the present disclosure, rather than all of the embodiments. All the other examples obtained by those of ordinary skills in the art in light of the embodiments of the present disclosure without inventive efforts would fall within the scope of protection of the present disclosure.

In the description of the present disclosure, it is to be understood that the orientation or position relation denoted by the terms such as "center", "upper", "lower", "left", "right", "vertical", "horizontal", "inner" and "outer" is based on the orientation or position relation indicated by the figures, which only serves to facilitate describing the present disclosure and simplifying the description, rather than indicating or suggesting that the device or element referred to must have a particular orientation, and is constructed and operated in a particular orientation, and therefore cannot be construed as a limitation on the present disclosure. In addition, the terms "first", "second" and "third" are only used for the purpose of description and cannot be understood as an indication or implication of importance in relativity.

In the description of the present disclosure, it should be noted that unless otherwise explicitly specified and defined, the terms "install", "link" and "connect" shall be understood in broad sense, which may, for example, refer to fixed connection, detachable connection or integral connection; may refer to mechanical connection or electrical connection; may refer to direct connection or indirect connection by means of an intermediate medium; or may refer to communication between two elements. Those of ordinary skills in the art could understand the specific meaning of the terms in the present disclosure according to specific situations.

Figure 1:
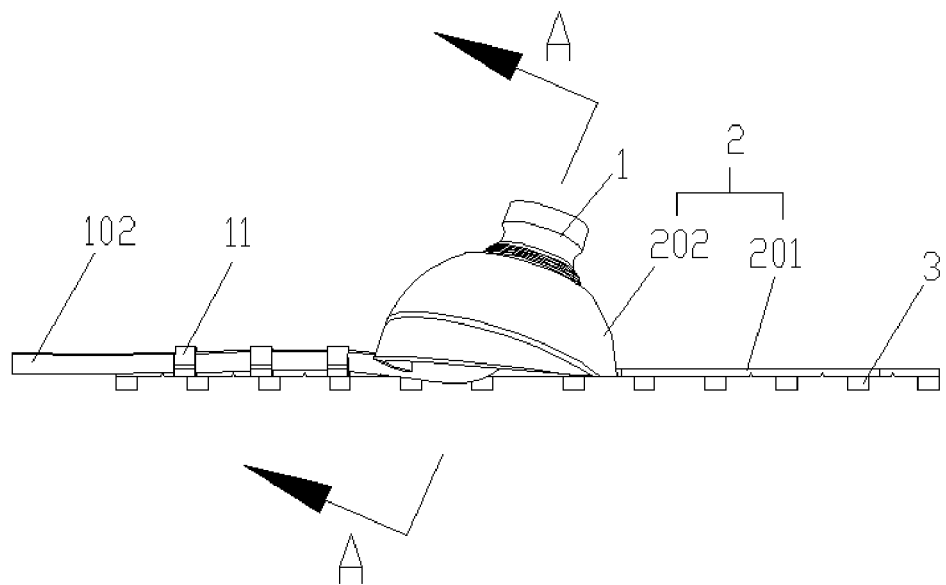
FIG. 1 is a schematic structural diagram of a vehicle image-taking device according to an embodiment of the present disclosure.
Figure 2:
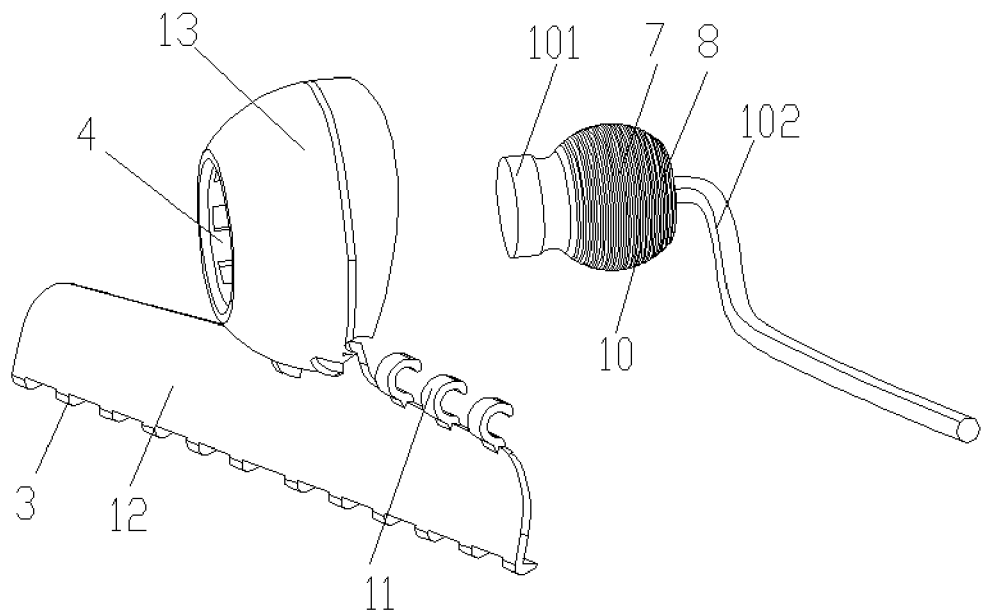
FIG. 2 is a structural exploded view of a vehicle image-taking device according to an embodiment of the present disclosure.

FIG. 1 is a schematic structural diagram of a vehicle image-taking device according to an embodiment of the present disclosure, and FIG. 2 is a structural exploded view of a vehicle image-taking device according to an embodiment of the present disclosure. As shown in FIG. 1 and FIG. 2, the present embodiment provides a vehicle image-taking device, capable of recording images inside or outside a vehicle when the vehicle is moving or parked. This vehicle image-taking device comprises an image-taking mechanism 1 and a fixing mechanism 2; the fixing mechanism 2 comprises a fixation portion 201 and an installation portion 202, the installation portion 202 is used for fixing the image-taking mechanism 1, the fixation portion 201 is provided thereon with a clamping member 3, and the clamping member 3 is used for being clamped in a rubber strip 10 of a vehicle.

With regard to the vehicle image-taking device provided by the present embodiment, in the use process, the clamping member 3 on the fixation portion 201 is clamped in the rubber strip 10 of a vehicle, so that the fixation portion 201 is fixedly connected with the vehicle, and since the image-taking mechanism 1 is fixed on the installation portion 202, the image-taking mechanism 1 is then fixed on the vehicle. Such installation manner of clamping is simple to operate, does not damage or contaminate the vehicle body, and reduces the installation cost. In addition, the clamping member 3 can cooperate with any rubber strip 10 in the vehicle, i.e., the installation position and the installation direction of the image-taking mechanism 1 inside the vehicle can be selected according to the actual situation, thereby expanding the application scope of the vehicle image-taking device.

As can be seen from the above, the installation manner of the vehicle image-taking device provided by the present embodiment is simple, and can avoid contaminating and damaging the vehicle body, which can effectively make up for the defects of the existing cameras.

Figure 3:
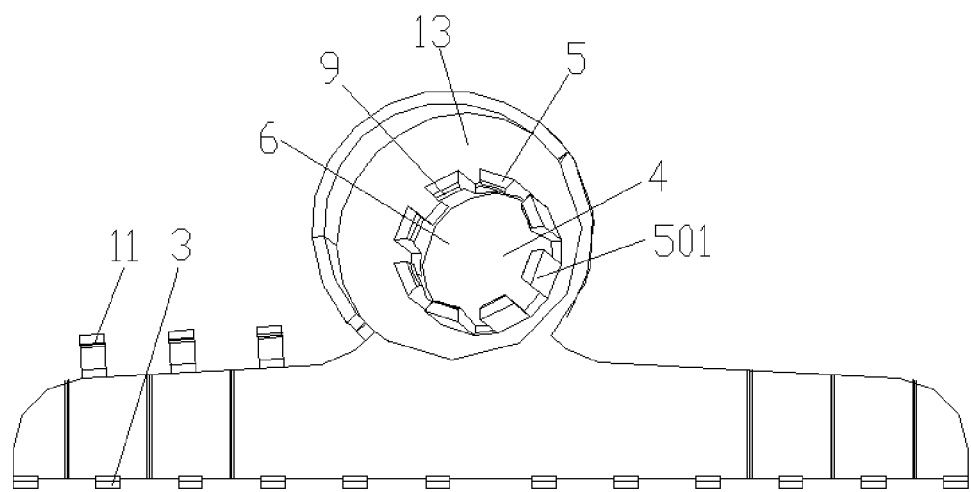
FIG. 3 is a schematic structural diagram of a fixing mechanism according to an embodiment of the present disclosure.
Figure 4:
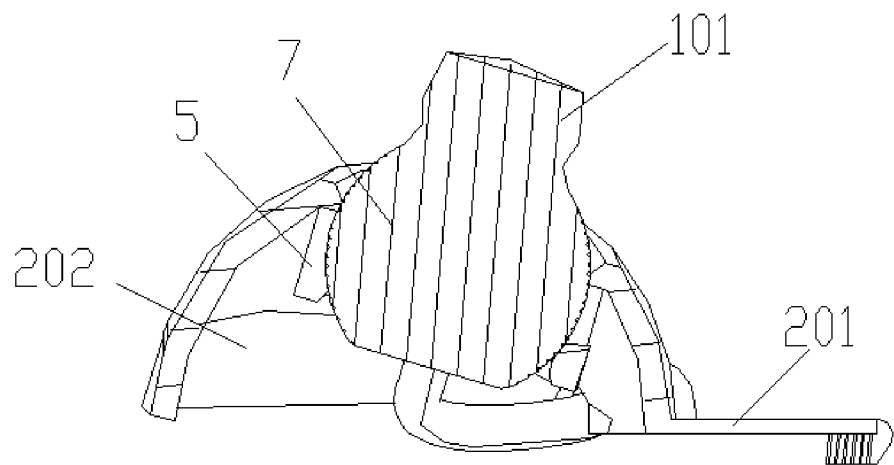
FIG. 4 is a sectional view at the position A-A in FIG. 1.

FIG. 3 is a schematic structural diagram of a fixing mechanism 2 according to an embodiment of the present disclosure, and FIG. 4 is a sectional view at the position A-A in FIG. 1. As shown in FIG. 1, FIG. 2, FIG. 3 and FIG. 4, on the basis of the above embodiment, further, the installation portion 202 is substantially ring-shaped and the installation portion 202 is provided with a through hole 4 and an adjusting member 5, and the through hole 4 is substantially circular. The adjusting member 5 is substantially ring-shaped and is disposed at the edge of the through hole 4. The adjusting member 5 extends in the axial direction of the through hole 4 towards the inside of the ring shape of the installation portion 202 to form a substantially cylindrical adjusting cavity 6. The image-taking mechanism 1 comprises a camera 101, with the camera 101 passing through the through hole 4. The camera 101 further comprises a substantially spherical adjusting portion 7, with the adjusting portion 7 disposed in the adjusting cavity 6, and the adjusting portion 7 is in interference fit with the adjusting member 5.

In the above, the fixation portion 201 comprises a connection plate 12, wherein the connection plate 12 is substantially an elongated flat plate. The clamping member 3 and the installation portion 202 are correspondingly arranged at two sides of the connection plate 12 in its own length direction, so that the distance between the clamping member 3 and the installation portion 202 can be increased, thereby providing a larger scope for arranging the image-taking mechanism 1, and that the image-taking mechanism 1 is prevented from interfering with other parts of the vehicle when the clamping member 3 is clamped in the rubber strip 10 of the vehicle, which therefore can further expand the application scope.

Further, different numbers of clamping members 3 may be set according to needs. In this embodiment, there are multiple clamping members 3, and the arrangement of multiple clamping members can make the connection between the clamping members 3 and the rubber strip 10 more stable, which improves the stability of the device.

Further, the multiple clamping members 3 are sequentially arranged at intervals in the length direction of the connection plate 12, and in this way, the multiple clamping members 3 can be more uniformly stressed, which improves the stability of the device and prolongs the service life of the device. In other embodiments, there can be other numbers of clamping members 3, e.g., 4 or 5.

Further, the clamping member 3 may be provided in different shape as needed. In this embodiment, the clamping member 3 may be arranged to be perpendicular to the connection plate 12. In other embodiments, the clamping member 3 may also be arranged to have an included angle smaller than 90° with the connection plate 12.

Further, the clamping member 3 is provided thereon with a friction portion which abuts against the rubber strip 10 of the vehicle.

In the above, the friction portion may comprise a friction protrusion or a matte layer.

In the present embodiment, when the clamping member 3 is clamped in the rubber strip 10 of the vehicle during use, the friction portion abuts against the rubber strip 10 of the vehicle, which can increase the friction force between the clamping member 3 and the rubber strip 10, thereby improving the stability of the connection between the clamping member 3 and the rubber strip 10, and further improving the stability of the connection between the vehicle image-taking device and the rubber strip 10.

Further, the adjusting member 5 may be arranged to have different shapes as needed. In this embodiment, the adjusting member 5 may be an adjusting ring. In other embodiments, the adjusting member 5 may also be of other shapes, e.g., may consist of two oppositely disposed adjusting blocks.

Further, the installation portion 202 shall further comprise a protective shell 13, wherein the protective shell 13 provided with a through hole 4, both the adjusting member 5 and the adjusting portion 7 are disposed inside the protective shell 13, and the protective shell 13 can function to protect the adjusting member 5 and the adjusting portion 7.

Further, the adjusting member 5 may be made of different materials according to needs. In this embodiment, the adjusting member 5 may be made of a plastic material, e.g. PC/ABS. In other embodiments, the adjusting member 5 may be made of other materials, such as a metal with elasticity.

Further, the inner diameter of the adjusting member 5 is at least smaller than the diameter of the spherical adjusting portion 7, so that the adjusting portion 7 can be in interference fit with the adjusting member 5.

Further, in this embodiment, the adjusting member 5 and the installation portion 202 are integrally formed, which can facilitate the manufacturing and processing and improve the stability of the device. In other embodiments, the adjusting member 5 may also be connected to the installation portion 202 by welding or the like.

In this embodiment, during use, a user makes the camera 101 pass through the through hole 4, to make the adjusting portion 7 interference-fitted with the adjusting member 5, so as to enable the camera 101 to be fixedly connected with the adjusting member 5, i.e., the camera 101 is fixedly connected with the installation portion 202, and to simultaneously enable the camera 101 to take images from the through hole 4. When the user needs to adjust the angle of the camera 101, the user can press the camera 101 towards the interior of the ring shape of the installation portion 202 to make the adjusting portion 7 separated from the adjusting member 5, then rotate the camera 101 in the adjusting cavity 6 to a preset angle, and move the camera 101 in the opposite direction to change the position where the adjusting portion 7 forms interference fit with the adjusting member 5, such that the camera 101 whose angle has been changed is fixedly connected to the installation portion 202.

Since the adjusting portion 7 has a spherical shape, no matter how the adjusting portion 7 is rotated, there is always a width allowing for interference fit with the adjusting member 5, and in this way, the adjustable range of the angle of the camera 101 can be enlarged, and therefore the scope of application of the device can be expanded.

As shown in FIG. 3, on the basis of the above embodiment, further, the adjusting member 5 may be arranged to have different structural forms according to needs. In this embodiment, the adjusting member 5 comprises a plurality of protrusions 501, with the plurality of protrusions 501 arranged at intervals at the edge of the through hole 4 in the circumferential direction of the through hole 4 to form the adjusting cavity 6.

In the above, each protrusion 501 extends in the axial direction of the through hole 4 towards the interior of the ring shape of the installation portion 202.

Further, the plurality of protrusions 501 are sequentially arranged at intervals, so that the plurality of protrusions 501 and the adjusting portion 7 can be stressed more uniformly.

In this embodiment, the adjusting member 5 comprises a plurality of protrusions 501, wherein the plurality of protrusions 501 are arranged at intervals at the edge of the through hole 4 to form the adjusting cavity 6. Since the adjusting member 5 is slightly deformed in the process of interference fit, arrangement of the plurality of protrusions 501 at intervals can provide space for the deformation of the adjusting member, thereby preventing the adjusting member 5 from being broken and prolonging the service life of the adjusting member 5.

On the basis of the above embodiment, further, the outer wall of the adjusting portion 7 is provided thereon with a first limiting member, and the surface of the adjusting member 5 that abuts against the outer wall of the adjusting portion 7 is provided with a second limiting member.

In the above, the first limiting member may comprise a plurality of limiting grooves arranged at intervals along the surface of the adjusting portion 7, the second limiting member may comprise a plurality of limiting bumps cooperating with the limiting grooves, and the plurality of limiting bumps are arranged at intervals in the length direction of the protrusion 501. During use, after the user adjusts the camera 101 to a preset angle and causes the adjusting portion 7 to be in interference fit with the adjusting member 5 again, the limiting bumps on the adjusting member 5 are embedded into the limiting grooves on the adjusting portion 7, so that the adjusting member 5 is fixedly connected with the adjusting portion 7. This arrangement can improve the stability of the connection between the adjusting member 5 and the adjusting portion 7, thereby improving the stability of the connection between the installation portion 202 and the camera 101.

In this embodiment, the outer wall of the adjusting portion 7 is provided thereon with a first limiting member, and the surface of the adjusting member 5 that abuts against the outer wall of the adjusting portion 7 is provided with a second limiting member. During use, when the user causes the adjusting portion 7 to be in interference fit with the adjusting member 5, the first limiting member and the second limiting member engage with each other, which makes the connection between the adjusting portion 7 and the adjusting member 5 more stable, thereby improving the stability of the connection between the installation portion 202 and the camera 101.

As shown in FIG. 2 and FIG. 3, on the basis of the above embodiment, further, the first limiting member comprises a plurality of convex edges 8, and the second limiting member comprises grooves 9 cooperating with the convex edges 8.

In this embodiment, the first limiting member comprises a plurality of convex edges 8, and the second limiting member comprises grooves 9 mated with the convex edges 8. During use, when the user causes the adjusting portion 7 to be in interference fit with the adjusting member 5, the convex edges 8 and the grooves 9 engage with each other, which makes the connection between the adjusting portion 7 and the adjusting member 5 more stable. The arrangement of the convex edges 8 and the grooves 9 can increase the mating area therebetween, thereby better improving the stability of the connection between the installation portion 202 and the camera 101.

As shown in FIG. 2 and FIG. 3, on the basis of the above embodiment, further, a plurality of convex edges 8 are sequentially arranged at intervals in the circumferential direction of the adjusting portion 7. There are multiple grooves 9, and the multiple grooves 9 are sequentially arranged at intervals.

In this embodiment, in the use process, such arrangement enables the plurality of convex edges 8 to simultaneously cooperate with the plurality of grooves 9, thereby improving the stability of the connection between the adjusting portion 7 and the adjusting member 5.

As shown in FIG. 2, on the basis of the above embodiment, further, the convex edges 8 may each include a rubber strip 10.

In the above, the rubber strip 10 may be made of a rubber material. In other embodiments, the rubber strip may also be made of silica gel.

In the present embodiment, the convex edge 8 is a rubber strip 10. The rubber strip 10 itself has elasticity, and in the process of embedding the rubber strip 10 into the groove 9, the rubber strip 10 is deformed so as to be embedded into the groove 9 more quickly. After the rubber strip 10 is embedded into the groove 9, the rubber strip 10 fills the gap of the groove 9, thereby improving the stability of the connection between the rubber strip 10 and the groove 9 and further improving the stability of the connection between the adjusting portion 7 and the adjusting member 5, to finally ensure stable connection between the installation portion 202 and the camera 101.

As shown in FIG. 1, FIG. 2 and FIG. 3, on the basis of the above embodiment, further, the image-taking mechanism 1 also comprises a wire 102. The wire 102 is electrically connected to the camera 101 and is used for transmitting image information recorded by the camera 101. The fixation portion 201 is provided thereon with a fastener 11, and the wire 102 is clamped in the fastener 11.

In the above, there may be multiple fasteners 11, the multiple fasteners 11 are arranged at intervals in the length direction of the connection plate 12, and the multiple fasteners 11 simultaneously fasten the wire 102, which can improve the stability of arrangement of the wire 102.

Further, the multiple fasteners 11 may be disposed at the left and right sides of the installation portion 202. This makes it convenient for the user to select, according to the actual situation, the direction in which the wire 102 is arranged.

In this embodiment, the image-taking mechanism 1 further comprises a wire 102 connected to the camera 101; and the fixation portion 201 is provided thereon with a fastener 11, and the wire 102 is clamped in the fastener 11. During use, the wire 102 is used for connection with an external power source, so as to energize the camera 101. The fastener 11 on the fixation portion 201 fastens the wire 102, preventing the wire 102 from being pulled off by the user due to being randomly placed.

On the basis of the above embodiment, further, an embodiment of the present disclosure also provides a vehicle which comprises the above-mentioned vehicle image-taking device.

In this embodiment, the vehicle comprises the vehicle image-taking device, wherein in the use process, the clamping member 3 on the fixation portion 201 is clamped in the rubber strip 10 of the vehicle, so that the fixation portion 201 is fixedly connected with the vehicle, and since the image-taking mechanism 1 is fixed on the installation portion 202, the image-taking mechanism 1 is then fixed on the vehicle. Such installation manner of clamping is simple to operate, does not damage or contaminate the vehicle body, and reduces the installation cost. In addition, the clamping member 3 can cooperate with any rubber strip 10 in the vehicle, i.e., the installation position and the installation direction of the image-taking mechanism 1 inside the vehicle can be selected according to the actual situation, thereby expanding the application scope of the device.

As can be seen from the above, the installation manner of the vehicle image-taking device of the vehicle described above is simple, and can avoid contaminating and damaging the vehicle body.

Finally, it should be indicated that the above embodiments are only used to illustrate the technical solutions of the present disclosure, rather than limiting the same; although the present disclosure has been described in detail with reference to the foregoing embodiments, it should be understood by those of ordinary skills in the art that the technical solutions described in the embodiments can still be modified, or equivalent substitution can be made to some or all of the technical features therein; and the modification or substitution would not cause the essence of the corresponding technical solutions to depart from the scope of the technical solutions of the embodiments of the present disclosure.

INDUSTRIAL APPLICABILITY

Overall Effect

For the vehicle image-taking device provided by the present disclosure, the installation is simple to operate, will not damage or contaminate the vehicle body, and can reduce the installation cost. In addition, the clamping member can be cooperate with any rubber strip in the vehicle, i.e., the installation position and the installation direction of the image-taking mechanism inside the vehicle can be selected according to the actual situation, thereby expanding the application scope of the device.

The invention claimed is:

1. A vehicle image-taking device, comprising an image-taking mechanism and a fixing mechanism,
    wherein the fixing mechanism comprises a fixation portion and an installation portion, the installation portion is used for fixing the image-taking mechanism, and the fixation portion is provided thereon with a clamping member configured for being clamped in a rubber strip of a vehicle.

2. The vehicle image-taking device according to claim 1, wherein the image-taking mechanism comprises a camera; and
    the installation portion is in a ring shape and provided with a through hole and an adjusting member, and the camera is configured to pass through the through hole and be in interference fit with the adjusting member.

3. The vehicle image-taking device according to claim 2, wherein the adjusting member, which is annular, is disposed at an edge of the through hole, and the adjusting member extends in an axial direction of the through hole towards an interior of the ring shape of the installation portion, so as to form an adjusting cavity; and
    the camera comprises a spherical adjusting portion disposed in the adjusting cavity, and the camera is interference-fitted with the adjusting member through the adjusting portion.

4. The vehicle image-taking device according to claim 3, wherein an inner diameter of the adjusting member is smaller than or equal to a diameter of the spherical adjusting portion.

5. The vehicle image-taking device according to claim 2, wherein the adjusting member comprises a plurality of protrusions; and
    the plurality of protrusions are arranged at intervals at the edge of the through hole to form the adjusting cavity.

6. The vehicle image-taking device according to claim 2, wherein the adjusting portion is provided thereon with a first limiting member, and the adjusting member is provided thereon with a second limiting member configured for cooperating with the first limiting member.

7. The vehicle image-taking device according to claim 6, wherein the first limiting member comprises a plurality of convex edges, and the second limiting member comprises grooves cooperating with the convex edges.

8. The vehicle image-taking device according to claim 7, wherein the plurality of convex edges are sequentially arranged at intervals in a circumferential direction of the adjusting portion; and
    the grooves are plural in number, the plurality of grooves are sequentially arranged at intervals, and the plurality of grooves are in one-to-one correspondence and in snap-fit engagement with the plurality of convex edges.

9. The vehicle image-taking device according to claim 7, wherein the convex edges each comprise a rubber strip.

10. The vehicle image-taking device according to claim 2, wherein the image-taking mechanism further comprises a wire electrically connected to the camera; and the fixation portion is provided thereon with a fastener, and the wire is clamped in the fastener.

11. The vehicle image-taking device according to claim 10, wherein a plurality of fasteners are arranged at intervals in a length direction of a connection plate, and the plurality of fasteners simultaneously fasten the wire.

12. The vehicle image-taking device according to claim 2, wherein the installation portion further comprises a protective shell, the protective shell is provided with a through hole, and the adjusting member is disposed inside the protective shell.

13. The vehicle image-taking device according to claim 2, wherein the adjusting member is made of a plastic material.

14. The vehicle image-taking device according to claim 2, wherein the fixation portion comprises a connection plate, and the clamping member and the installation portion are correspondingly disposed at two opposite sides of the connection plate.

15. The vehicle image-taking device according to claim 14, wherein a plurality of clamping members are provided and arranged at intervals in a length direction of the connection plate.

16. The vehicle image-taking device according to claim 14, wherein the clamping member is perpendicular to the connection plate.

17. The vehicle image-taking device according to claim 2, wherein the adjusting member is integrally formed with the installation portion.

18. The vehicle image-taking device according to claim 1, wherein the clamping member is provided thereon with a friction portion; and
    the friction portion is configured for abutting against the rubber strip of the vehicle.

19. The vehicle image-taking device according to claim 18, wherein the friction portion comprises a friction protrusion or a matte layer.

20. A vehicle, comprising the vehicle image-taking device according to claim 1.

* * * * *